United States Patent
Kofflin

[19]

[11] Patent Number: 6,116,300
[45] Date of Patent: Sep. 12, 2000

[54] PUSH-PULL TYPE PRE-CONDITIONED AIR ADAPTER

[76] Inventor: David Francis Kofflin, 7550-22nd Ave. S., Minneapolis, Minn. 55450

[21] Appl. No.: 09/324,596

[22] Filed: Jun. 3, 1999

[51] Int. Cl.⁷ ....................................................... B65B 1/04

[52] U.S. Cl. ........................... 141/382; 141/383; 141/384; 141/387; 141/389; 141/391; 141/113; 244/118.5

[58] Field of Search ..................................... 141/382, 383, 141/384, 387, 389, 390, 391, 113, 312; 244/118.5; 285/308, 312, 379; 277/619

[56] References Cited

U.S. PATENT DOCUMENTS 5,927,355  7/1999  Kofflin .................................... 141/383

*Primary Examiner*—Henry J. Recla
*Assistant Examiner*—Timothy L. Maust
*Attorney, Agent, or Firm*—Thomas B. Tate

[57] ABSTRACT

A pre-conditioned air adapter chute to connect an aircraft to a pre-conditioned air unit on the ground. The adapter is a type which can be attached to the aircraft by pushing up on the adapter's handles to cause the safety latches to engage the aircraft, and can be removed from the aircraft by pulling down on the handles.

1 Claim, 1 Drawing Sheet

U.S. Patent    Sep. 12, 2000    6,116,300
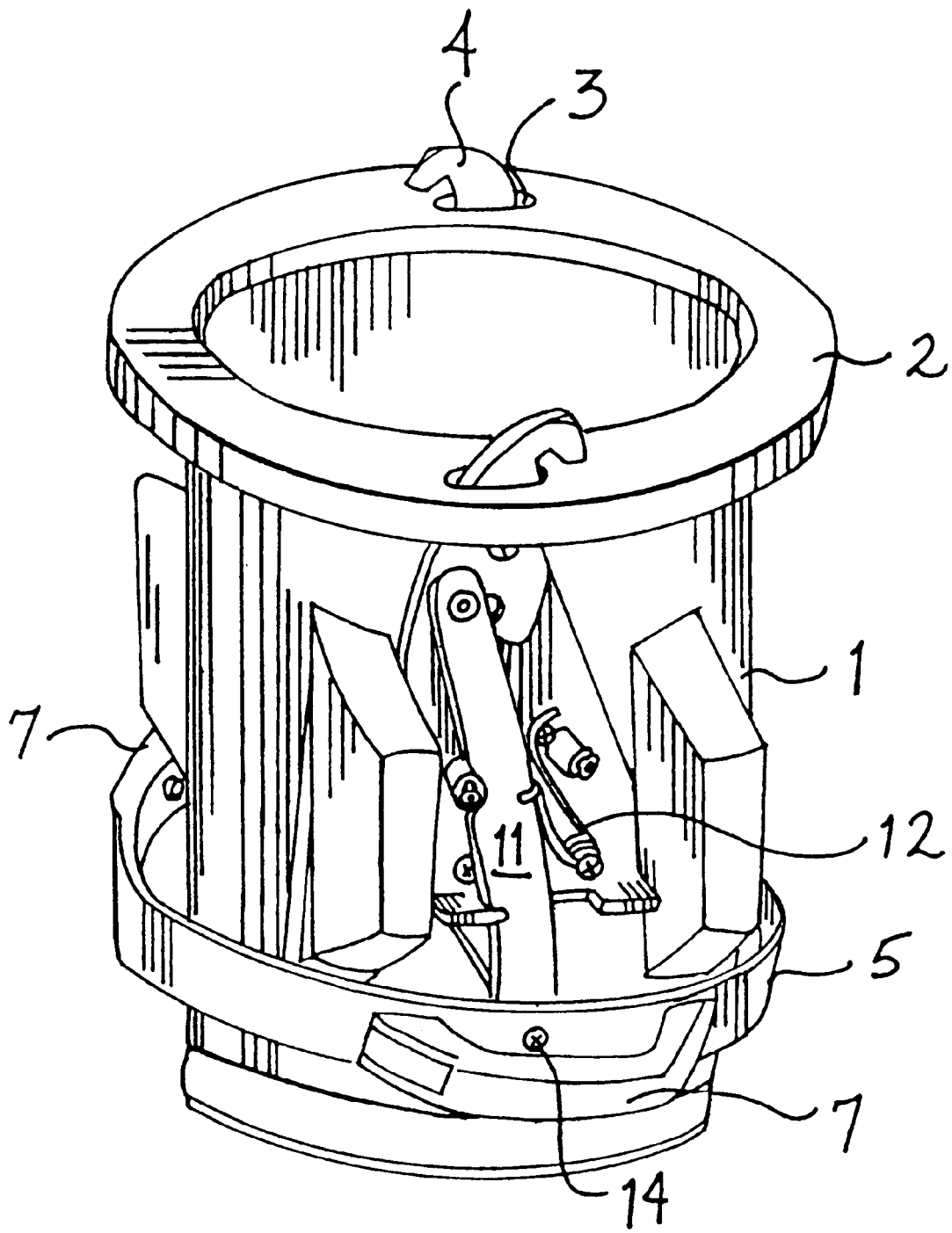

PUSH-PULL TYPE PRE-CONDITIONED AIR ADAPTER

BACKGROUND OF THE INVENTION

The field of the invention is pre-conditioned air adapter chutes, used to connect a pre-conditioned air unit on the ground to the aircraft it is servicing.

The type of chute traditionally used in the airline industry is a cone-shaped metal chute with a bar-type clamp and no handles.

The type of chute which is the current state of the art is described in my U.S. Pat. No. 5,355,917. That chute is plastic, has a cylindrical top end and a conical bottom end, and has hooks which attach to the aircraft when adjusted by rod and clamp assemblies mounted on the handles.

SUMMARY OF THE INVENTION

The present invention is a pre-conditioned air adapter chute which can be described as a push-pull or click-on/click-off type. The chute has handles mounted on a ring which is connected by a bar and cam structure to safety latches which attach the chute to the aircraft.

An advantage of the invention is that it can be easily attached and detached from the aircraft by pushing up on the handles to attach and pulling down on the handles to detach.

Another advantage is that these same handles used for installing the chute onto the aircraft can also be used as carrying handles.

Another advantage is that this chute has safety latches which turn and lock into position in order to hold the chute more firmly onto the aircraft while it is being serviced.

Another advantage is that this chute has a one-piece rubber gasket, so that no metal collar is needed.

DESCRIPTION OF THE DRAWING

The FIGURE is a side perspective view.

DESCRIPTION OF THE INVENTION

The pre-conditioned air adapter chute has a hollow, generally cylindrical adapter body 1 which is made of plastic material, preferably high density polyethylene (HDPE). When in use, the top end of the adapter body 1 connects to the aircraft being serviced and the bottom end of the adapter body 1 connects to the pre-conditioned air unit located on the ground.

A one-piece rubber gasket 2 is formed at the top end of the adapter body 1. The gasket 2 is provided with two openings 3 located on opposite sides of the gasket 2. Safety latches 4 pass through openings 3 and engage the aircraft while the adapter chute is in use.

A ring structure 5 is positioned around the adapter body 1 near the bottom end of the adapter body 1. Two handles 7 are mounted onto the ring 5 on opposite sides of the ring 5. A bar 11 which is attached to an eccentric cam structure 12 extends vertically from each of the safety latches 4 to the ring 5 in the vicinity of each handle 7. The bars 11 are each attached to the ring 5 by a screw 14 mounted into the ring 5 approximately midway between the two ends of a handle 7. A protective cover (not shown) is mounted onto the adapter body 1 to protect each of the bar 11 and cam 12 assemblies.

To use the adapter chute, the operator pushes up on the handle 7 to cause the safety latches 4 to lock into position on the aircraft. The handles 7 are pulled down to release the safety latches 4 and allow the chute to be removed from engagement with the aircraft.

I claim:

1. A pre-conditioned air adapter chute wherein said chute is adapted to connect an aircraft to a pre-conditioned air unit located on the ground, said adapter chute comprising:

a hollow, generally cylindrical adapter body which has a top end attachable to said aircraft and a bottom end attachable to said pre-conditioned air unit;

a ring positioned around said adapter body near said bottom end of said adapter body;

a pair of handles mounted on said ring on opposite sides of said adapter body;

a one-piece gasket formed at said top end of said adapter body, said gasket having openings therethrough;

a safety latch projecting through each of said openings in said gasket;

a bar and offset cam structure connecting each of said latches to said ring at points near each of said handles, such that when said handles are pushed upward, said safety latches lock said adapter body onto said aircraft, and when said handles are pulled downward, said safety latches are released, allowing said adapter body to be removed from engagement with said aircraft.

* * * * *